Figure 1:
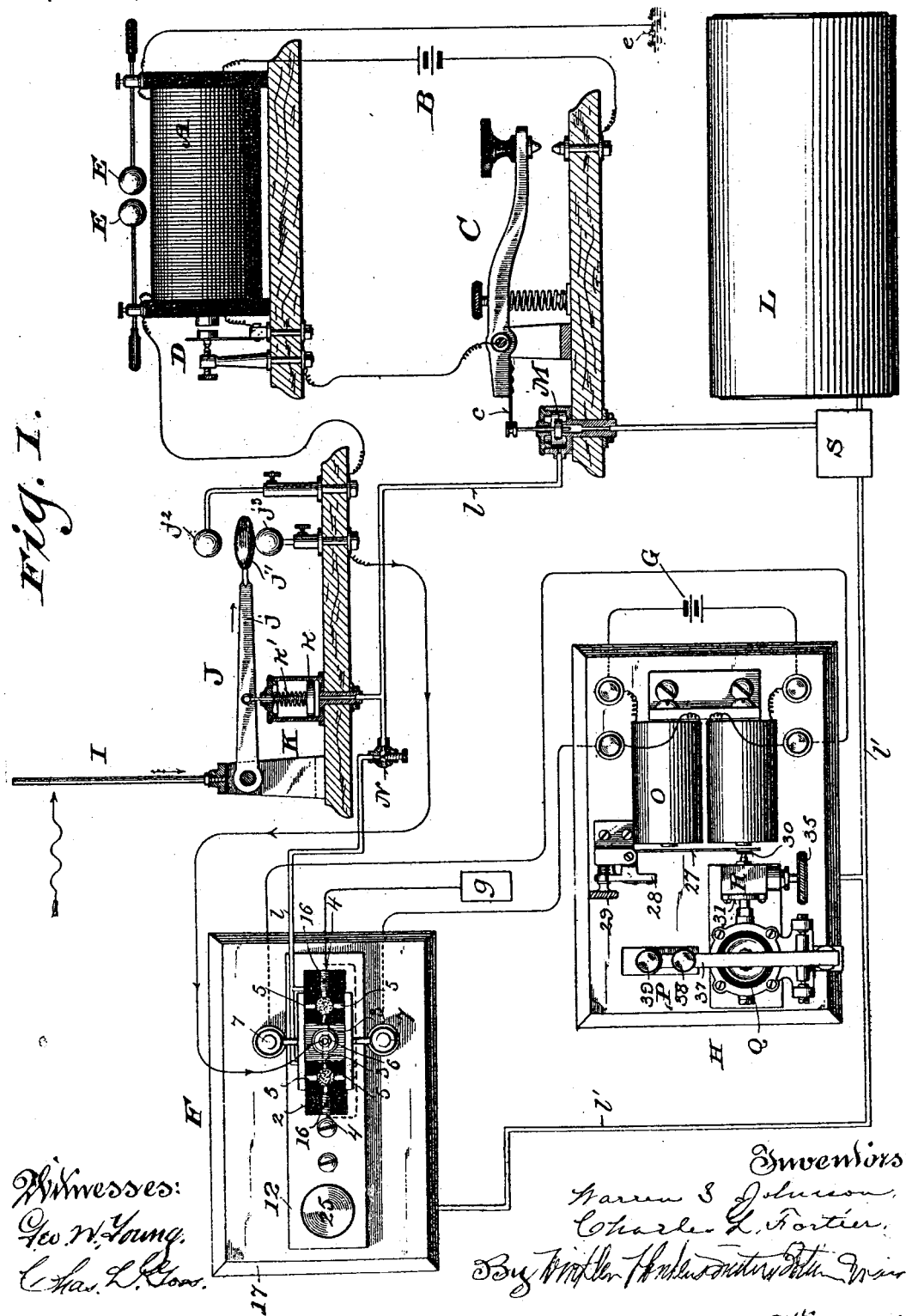

No. 664,869. Patented Jan. 1, 1901.
W. S. JOHNSON & C. L. FORTIER.
ELECTRIC WAVE TELEGRAPH.
(Application filed Feb. 16, 1900.)
(No Model.) 5 Sheets—Sheet 2.

No. 664,869. Patented Jan. I, 1901.
W. S. JOHNSON & C. L. FORTIER.
ELECTRIC WAVE TELEGRAPH.
(Application filed Feb. 16, 1900.)
5 Sheets—Sheet 3.
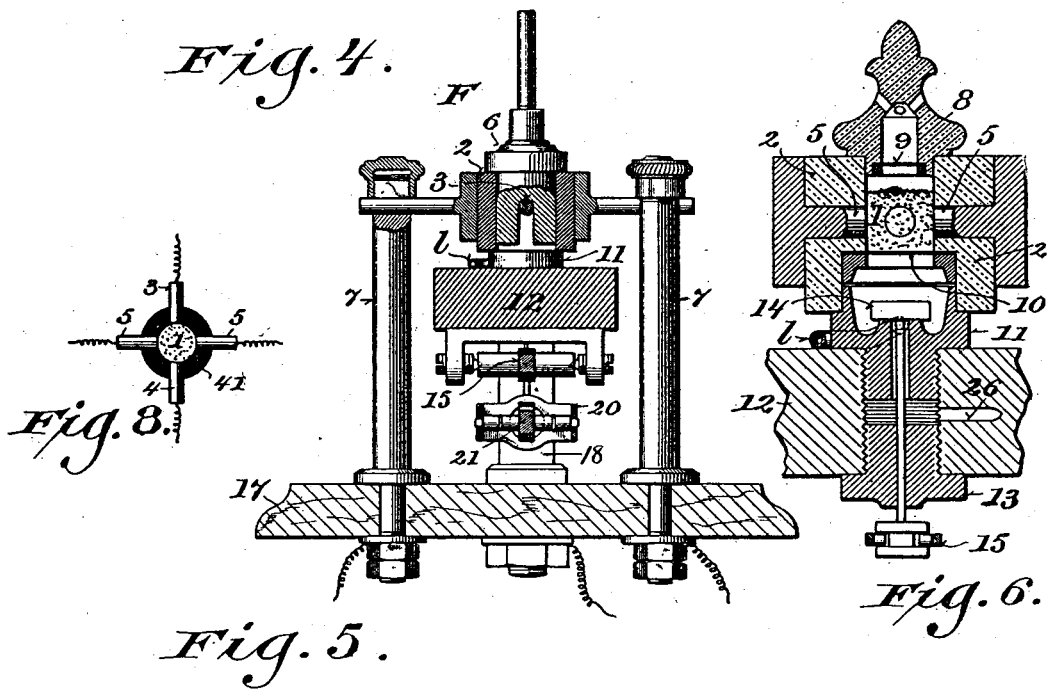
Fig. 4.
Fig. 8.
Fig. 5.
Fig. 6.
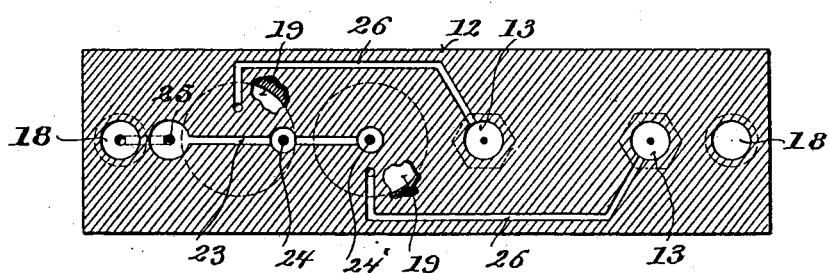
Fig. 7.
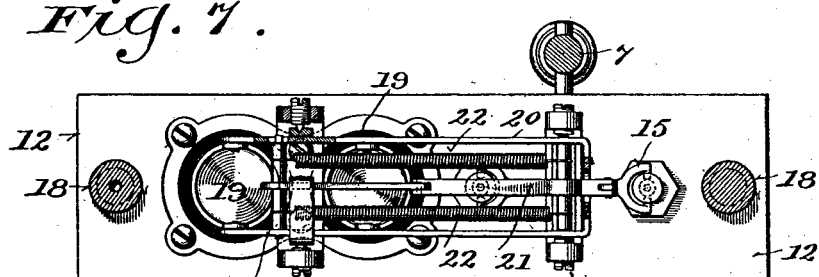
Witnesses:
Geo. W. Young.
Chas. L. Goss.
Inventors:
Warren S. Johnson
Charles L. Fortier
By Winkler Flanders Smith Bottum & Vilas
Attorneys.

No. 664,869. Patented Jan. 1, 1901.
W. S. JOHNSON & C. L. FORTIER.
ELECTRIC WAVE TELEGRAPH.
(Application filed Feb. 16, 1900.)
(No Model.) 5 Sheets—Sheet 4.
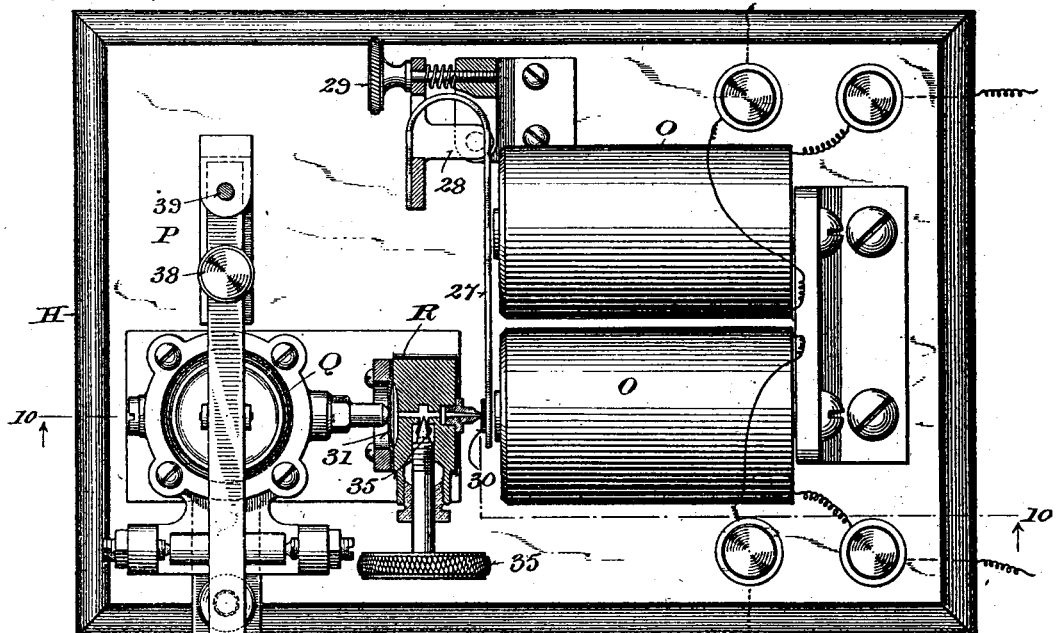
Fig. 9.
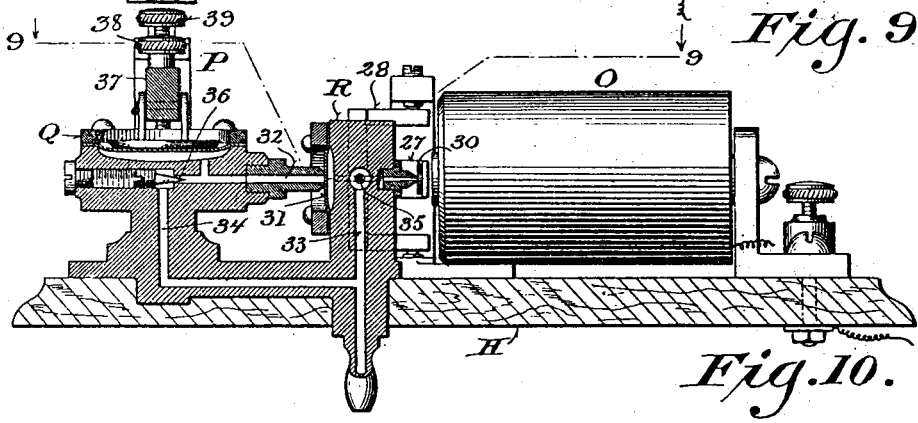
Fig. 10.
Fig. 11.
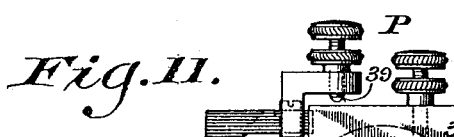
Witnesses:
Geo. W. Young.
Chas. L. Goss.
Inventors:
Warren S. Johnson,
Charles L. Fortier,

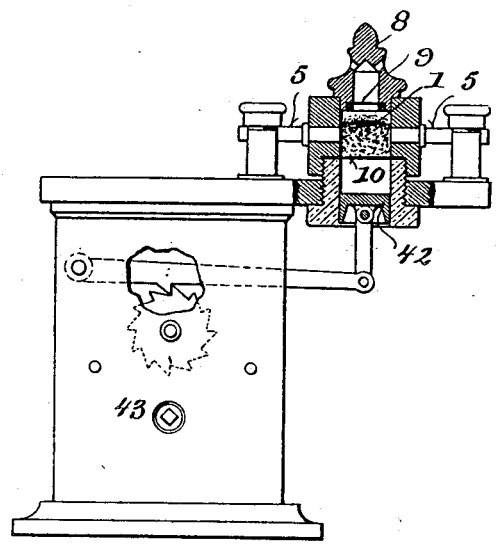

UNITED STATES PATENT OFFICE.

WARREN S. JOHNSON AND CHARLES L. FORTIER, OF MILWAUKEE, WISCONSIN, ASSIGNORS TO THE AMERICAN WIRELESS TELEGRAPH COMPANY, OF SAME PLACE.

ELECTRIC-WAVE TELEGRAPH.

SPECIFICATION forming part of Letters Patent No. 664,869, dated January 1, 1901.

Application filed February 16, 1900. Serial No. 5,426. (No model.)

*To all whom it may concern:*

Be it known that we, WARREN S. JOHNSON and CHARLES L. FORTIER, citizens of the United States, residing at Milwaukee, in the county of Milwaukee and State of Wisconsin, have invented certain new and useful Improvements in Electric-Wave Telegraphs, of which the following is a specification, reference being had to the accompanying drawings, forming a part thereof.

Our invention relates, primarily, to so-called "electric-wave" or "wireless" telegraphy or to the transmission of messages or signals by means of electric waves or oscillations of high frequency which are propagated through space or conductors.

The main objects of the invention are to simplify and improve the construction, increase the efficiency, and render more positive and reliable the operation of apparatus of this class.

It consists in various improvements in the sending and receiving mechanism and in the construction and arrangement of component parts of the apparatus, as hereinafter particularly described, and pointed out in the claims.

In complete apparatus of this kind there are both sending and receiving mechanisms at each station. The sending mechanism usually comprises a spark or wave producing device, sometimes called an "oscillator," and an operating lever or key. The receiving mechanism usually comprises a sensitive variable contact, called a "coherer," in a local circuit including a source of current and an electromagnetic relay, and an auxiliary electric circuit including a more powerful source of current, an electromagnetic signal recording or indicating instrument, and electromagnetic means for jarring the coherer and rendering it non-conductive. Associated with the sending and receiving mechanism is an insulated wave propagating and intercepting conductor which is manually connected either with the oscillator for transmitting or with the coherer for receiving messages or signals. The sensitive portion of the receiving mechanism is the coherer, which usually consists of a non-conducting tube containing a metallic powder or other equivalent granular conducting substance. The effect of the electric waves or pulsations originating at the sending-station and intercepted by or concentrated upon the insulated conductor at the receiving-station is to bring the particles of the metallic powder or other granular substance of the associated coherer closer together in such a way as to render it a comparatively good conductor, whereas in its normal condition it is a very poor conductor of electricity. The changes thus produced in the coherer from a poor to a good conductor cause the relay to act and to close the auxiliary circuit containing the electromagnetic signal recording or indicating instrument. When the metallic powder or other granular conducting substance is once cohered, it will under ordinary conditions continue to be a good conductor for some time if it is left undisturbed. If, however, it is tapped or jarred, its conductivity will usually be destroyed or greatly reduced. This jarring has heretofore been effected by some mechanical means, such as a small hammer striking the tube containing the powder. This hammer has usually been operated by an electromagnet connected with or controlled by the coherer in such a way that the electric impulses or waves which render the powder of the coherer conductive will put the hammer in motion to separate or decohere the powder. Such means for decohering the powder and rendering it non-conductive are found to be uncertain and unreliable. It frequently occurs that the blow intended to separate and decohere the powder tends rather to pack it closer. Besides, the hammer mechanism must be very delicately adjusted to produce the desired results. As the sending and receiving instruments must necessarily be in close proximity with each other, it has been found that with apparatus heretofore employed the powerful impulses produced by the associated sending instrument have very injurious effects on the coherer. It has also been found that a current of sufficient power to properly operate the electromagnetic signal recording or indicating instrument in the auxiliary circuit detrimentally affects the coherer and tends to produce confusion and uncertainty in the receipt of the messages or signals. For these reasons special devices for preventing such injurious effects and detrimental influences have been provided. With electricity as the auxiliary power for the operation of a register or sounder and of the hammer for jarring the coherer, such operation being dependent upon the received wave impulses under the control of the coherer, it is extremely difficult to produce Morse characters or signals with clearness and certainty, because under such conditions the register or sounder, responding to the rapid pulsations or wave impulses, will not produce or indicate true dots and dashes, but an interrupted series of more or less confused fine dots. This is especially the case with a sounder. In our improved apparatus we dispense with auxiliary electric circuits and electromagnetic instruments, which tend to derange and affect the proper working of the receiving mechanism, and preferably employ a fluid under pressure for the auxiliary service. We prefer a decohering apparatus which works independently of the received electric waves or impulses and may be operated or controlled by any suitable motive power. Preferably we separate or disturb the powdered or granulated conducting material or other sensitive variable contact of the coherer by impulses or currents of air or of other suitable fluid directed through or against the coherer. By the well-known effects of an air-blast the particles of powdered or granulated material are effectively separated, and complete decoherence thereof is insured in every case. We also prefer to use fluid-pressure controlled by an electromagnet in circuit with the coherer for the operation of all such instruments as telegraph registers, sounders, &c., and we may obtain such fluid-pressure from the same source as that employed for decoherence. Under these conditions either form of receiving instrument operates with the same certainty and positiveness that it does in an ordinary wire circuit. Fluid-pressure mechanism is capable of greater delicacy of adjustment and operation than electrical mechanism and does not produce the disturbing effects of induction, sparking, &c., upon the coherer, and hence does not detrimentally affect its operation nor the operation of the mechanism dependent upon the proper working of the coherer. In our improved apparatus as hereinafter described the injurious effects upon the delicate receiving apparatus of the powerful electric impulses produced by the associated sending instruments are avoided by separating or disturbing the powder or sensitive variable contact of the coherer and rendering the same non-conductive whenever the sending instrument is in operation. With each depression of the key by which the sending instrument is put in service the insulated conductor, which is normally connected with the coherer, is automatically switched into connection with the sending instrument, and at the same time communication is established between the coherer and a source of fluid-pressure, whereby the powder or other sensitive variable contact of the coherer is agitated and made non-conductive whenever electric waves are produced by the sending mechanism. As the key is released the connection of said conductor with the receiving instrument is reëstablished, and the fluid connection above mentioned of the coherer is closed. The result of this arrangement is that a distant operator has the use of said conductor at all times except when the key of the associated transmitting instrument is depressed and closes the circuit through the battery. In this way a distant operator is enabled to interrupt the sending of a message at any point and call for explanation or correction, according to the common practice in ordinary telegraphy, whereas with apparatus of this class as heretofore arranged there can be no use made by a distant operator of the receiving instrument of any station while a message is being sent from that station, nor afterward, until the associated conductor is manually connected with such receiving instrument.

Figure 2:
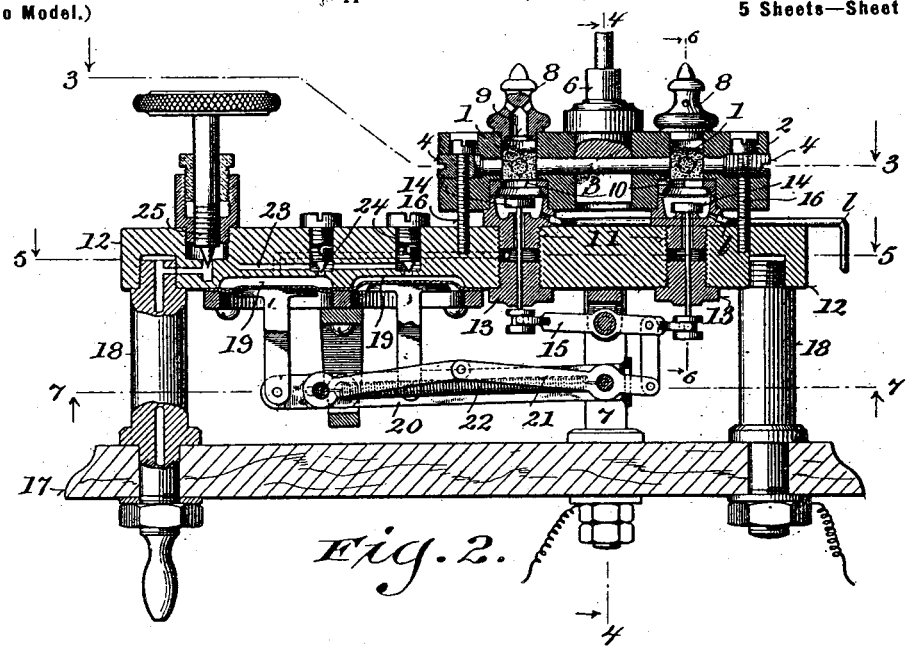
Figure 3:
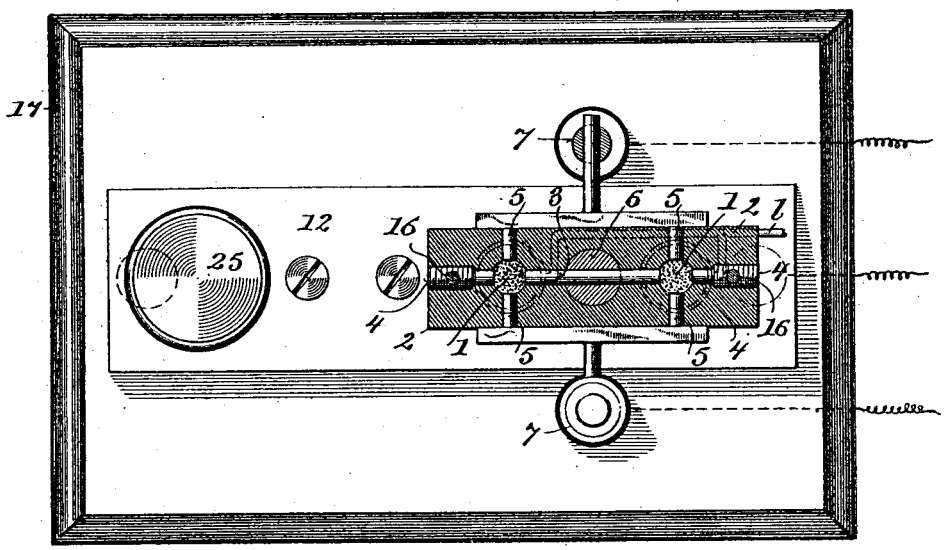

Referring to the accompanying drawings, which illustrate apparatus embodying our improvements, and in which like characters designate the same parts in the several views, Figure 1 is a diagram illustrating the general arrangement of the sending and receiving mechanism and their connections constituting the complete equipment of a single station, certain instruments or parts of the apparatus being shown in plan view or elevation, while other parts or instruments are shown in section. Fig. 2 is a vertical longitudinal section, on an enlarged scale, of the coherer and decohering devices forming a part of the receiving mechanism. Fig. 3 is a horizontal section on the line 3 3, Fig. 2. Fig. 4 is a vertical cross-section on the line 4 4, Fig. 2. Fig. 5 is a horizontal section on the line 5 5, Fig. 2, through the metallic base of the coherer. Fig. 6 is an enlarged vertical cross-section on the line 6 6, Fig. 2. Fig. 7 is a horizontal section on the line 7 7, Fig. 2, and an inverted plan view of the decohering mechanism. Fig. 8 is a cross-section of a modified form of coherer having a variable contact, showing the arrangement of the electrodes or insulated electrical connections with the wave-intercepting or concentrating conductors and with the local circuit of which said variable contact forms a part. Fig. 9 is a plan view and partial horizontal section on the broken line 9 9, Fig. 10, of the electropneumatic-wave-indicating instrument forming another part of the receiving mechanism. Fig. 10 is a vertical longitudinal section thereof on the broken line 10 10, Fig. 9. Fig. 11 is an end elevation of the same as viewed from the left with reference to Figs. 9 and 10. Fig. 12 is a view, partly in elevation and partly in section, of a coherer and a modified decohering device; and Fig. 13 is a view of another modification of the decohering mechanism.

Referring to Fig. 1, the transmitting mechanism comprises an ordinary Ruhmkorff or induction coil A, the primary of which is included in a local circuit with a battery B or other source of current, an operating-lever or Morse key C, and a vibrating interrupter D. The terminals of the secondary of the induction-coil are connected with two insulated metallic spheres or conductors E E, which are separated from each other by a small space. These spheres or conductors, which constitute the oscillator or electric-wave exciter, are made adjustable, so as to vary the space between them, according to the strength of the current, the size of the induction-coil, the distance that messages or signals are to be transmitted, and other conditions. The receiving mechanism comprises a coherer or wave-detecting instrument F, having one or more sensitive variable contacts capable of being rendered conductive by Hertzian waves or electric oscillations of high frequency and non-conductive by jarring or agitation, means for jarring or agitating said variable contact or contacts, and a local circuit of which said contact or contacts form a part, including a battery G or other source of current and an electropneumatic signal recording or indicating instrument H. 1 is an insulated aerial conductor associated with the sending and receiving mechanism and serving when connected with the transmitting mechanism to concentrate and propagate or transmit the electric-wave impulses and when connected with the receiving mechanism to intercept and concentrate such impulses. J is a switch the pivoted lever or arm j of which is electrically connected with the conductor I and is provided with a spheroidal contact j' between two stationary spherical contacts j² and j³. The fixed or stationary contacts are made adjustable, so as to vary the space between them and the movable contact j'. The contact j² is electrically connected with one of the spheres or conductors E of the oscillator or wave-exciting instrument. The other contact j³ is electrically connected with the variable contact or contacts of the coherer. The other sphere E or conductor of the oscillator preferably has a ground connection e. K is a fluid-pressure motor the piston or movable part k of which is connected with the lever-arm j of the switch. k' is a spring acting in opposition to the fluid-pressure in said motor and normally holding the movable contact j' of said switch in engagement with the fixed contact j², whereby the aerial conductor I is connected with the wave-detecting instrument or coherer of the receiving mechanism. L designates a compressed-air reservoir or other source of fluid-pressure. It is connected by a pipe l with the variable contact or contacts of the coherer F and with the motor K, to which the supply of the fluid-pressure medium is controlled by a valve M, operatively connected with the key C by means of a spring or yielding connection c. N is a pin-valve in the pipe l between the coherer and the motor K for restricting or retarding the compressed air or other fluid-pressure medium to the variable contact or contacts of the coherer.

Referring to Figs. 2 to 8, inclusive, in connection with Fig. 1, we preferably employ in our apparatus as a part of the receiving mechanism a double or multiple coherer having two or more variable contacts, each consisting of an insulating tube or receptacle containing metallic powder or filings or other suitable granular conducting substance capable of being made conductive when subjected to the influence of Hertzian waves and non-conductive by jarring or agitation. In our preferred form of wave-detecting instrument or coherer, as shown in Figs. 2, 3, and 6, two or more vertically-disposed cavities or receptacles 1 1 are formed for the metallic powder or other granular substance in a block 2 of hard rubber or other suitable insulating material. Metallic rods or plugs 3, 4 4, and 5 5 inserted in and insulated from each other by the block 2 constitute two pairs of electrodes for each of the receptacles 1 1, each projecting at one end into contact with the metallic powder or other granular conducting substance contained in said receptacles. The rod 3, forming one of the electrodes for both receptacles 1 1, is electrically connected by a metallic plug 6 in the block 2 with the aerial conductor I through the switch J. The two plugs 5 5 on each side of the block 2 are electrically connected with each other and with an insulated post 7. The upper ends of the receptacles 1 are closed by caps 8, which are perforated and provided with screens 9, as shown in Fig. 6, to permit the passage of air through the powdered or granular material contained in said receptacles and at the same time to confine said powder or granular material therein. The lower ends of said receptacles are provided with screens 10, which support the powder or granular material, and they are closed below said screens with recessed plugs 11, which form valve-chambers. The plugs 11 are screwed into or otherwise secured in a metal plate 12, and they are formed with central holes or passages which connect the valve-chambers at their upper ends with chambers at their lower ends in said base-plate. The lower ends of said chambers in the base-plate are closed by plugs 13, which are perforated in line with the holes in the plugs 11. The screens 9 and 10 may be conveniently made of silk gauze. 14 are valves having seats around the holes in the upper recessed ends of the plugs 11 and stems which pass downwardly through said plugs and the plugs 13 and fit closely in the plugs 13, so as to prevent the escape of air or other fluid. The lower protruding ends of the stems of said valves are pivotally connected with the ends of a rocking lever 15, which is fulcrumed at the center in a bracket on the under side of the base-plate 12. The metal plugs 4 4 opposite the ends of the rod 3 are electrically connected with the plate 12 by screws 16. The posts 7 are secured in an insulating-base 17, and the plate 12 is supported upon posts 18, which are also secured in said insulating-base 17. Two fluid-pressure motors 19 have their movable parts pivotally connected with a frame 20, which is fulcrumed midway between them to a bracket on the underside of the plate 12. The frame 20 carries a toggle 21, one member of which has a sliding connection and the other member a pivotal connection with said frame, the two members of the toggle being connected by springs 22, which tend to bend the toggle to its limit in either direction. One member of the toggle, which extends beyond its pivotal connection with the frame 21, is connected by a link with one arm of the rocking lever 15. The expansion-chambers of the motors 19 are formed by cavities in the under side of the plate 12 and by flexible diaphragms closing said cavities. A fluid-supply passage 23, formed in the plate 12, communicates through ports adjustably restricted by pin-valves 24 with said expansion-chambers, as shown in Figs. 2 and 5, and it is connected by a passage through one of the posts 18, as shown in Fig. 2, and by a pipe $l'$, as shown in Fig. 1, with the reservoir L or other source of fluid-pressure. The supply of air or other fluid-pressure medium to both motors through the passage 23 is controlled and adjusted by a valve 25. The plate 12 is also formed with passages 26, leading from the expansion-chambers of the motors 19 into the openings in said plate below the plugs 11. The pipe $l$, which leads from the reservoir L and is controlled by the valve M, connects through branches with the valve-chambers in the upper ends of said plugs 11.

Referring to Figs. 9, 10, and 11, the signal recording or indicating instrument H comprises an electromagnet O, a sounder P, and a fluid-pressure motor Q, the operation of which is controlled by valve mechanism R, which is in turn controlled by said electromagnet. The magnet O preferably has two separated coils, one of which is connected with one of the posts 7 of the wave-detecting instrument F and with one pole of the battery G, while the other coil is connected with the other post 7 and with the other pole of said battery, as shown in Fig. 1. The armature 27 of said magnet is preferably made in the form of a U-shaped spring, which is attached by one arm to a pivoted support 28, adjustable by means of a screw 29. To the other free arm of this spring, which extends across the ends of the magnet-cores in close proximity therewith, is attached a pad or valve 30, controlling the outlet or waste port of an expansion-chamber 31. The movable wall or part of the expansion-chamber 31 forms or is provided with a valve which controls the waste port or passage 32 of the motor Q. Supply-passages 33 and 34 of the expansion-chamber 31 and of the motor Q are adjustably restricted by means of valves 35 and 36 to areas smaller than their respective waste ports or passages and are connected, as shown in Fig. 1, by the pipe $l'$ with the compressed-air reservoir L or other source of fluid-pressure. The waste passage or port of the expansion-chamber 31 is of smaller area than the waste port or passage 32 of the motor Q, whereby a very slight movement or change in the adjustment of the delicate electrically-actuated valve 30 is made to positively and promptly control or affect the operation of the motor Q with the expenditure of a very little energy and without appreciable effect on the sensitiveness of the mechanism. The movable part of the motor Q is connected with a lever 37, provided with front and back stops 38 and 39, like or similar to the lever of a Morse sounder or recorder. A spring 40 acts on said lever in opposition to the fluid-pressure in motor Q and when said motor is depleted moves and holds said lever against its front stop, as shown in Fig. 11. By means of this lever the electric-wave impulses which affect the variable contact or contacts of the coherer are indicated by sound or may be registered on a strip of paper in the usual way.

To prevent corrosion of or injury to the metallic powder or other sensitive variable contact of the coherer, the compressed air or other gas by which decoherence is effected is passed through a receptacle S, as shown in Fig. 1, containing calcium chlorid or other equivalent material for depriving the air or other gas of moisture.

The apparatus hereinbefore described operates as follows: By depressing the key C of the transmitting instrument, according to the usual practice in transmitting messages in ordinary telegraphy, the circuit is closed through the primary of the induction-coil A, battery B, and interrupter D, which automatically and rapidly makes and breaks the circuit. An alternating current of high potential is thus induced in the secondary of the induction-coil, and sparks or discharges are thus caused to take place between the metal balls E E and electrical oscillations of high frequency, or "Hertzian waves," so called, are produced in the surrounding space and concentrated upon the conductors connected with said balls. With each depression of the key C the valve M is opened, admitting compressed air to the motor K and to the coherer. The admission of compressed air to the motor K instantly shifts the movable contact $j'$ of switch J into engagement with the fixed contact $j^2$, thus electrically connecting the aerial conductor I with one of the balls E of the oscillator or wave-exciting instrument. From the aerial conductor I the electric waves or impulses which are set up therein are communicated to the surrounding ether, through which they are propagated, or under certain conditions these waves or impulses may be concentrated upon and communicated to distant stations by metallic or other suitable conductors. With each depression of the key by which the electric-wave exciter is put in operation compressed air is admitted through the restricting-valve N to the metallic powder contained in the receptacles 1 of the coherer, and such powder is agitated or disturbed and held in a non-conductive condition when the powerful wave-impulses are produced by the associated transmitting instrument. The injurious effects of these impulses upon the sensitive contacts of the coherer are thus prevented. When the key C is released, the valve M closes its supply-port, cutting off communication of the coherer and motor K with the reservoir L and opening a waste port or passage around the valve-stem, through which the compressed air escapes from the motor K, allowing the spring $k'$ to shift the movable contact $j'$ of the switch into engagement with the fixed contact $j^3$, thereby reëstablishing electrical connection between the aerial conductor I and the coherer and putting the apparatus in condition for the receipt of messages or signals from a distant station. The electric waves produced as above explained are intercepted by and concentrated upon the aerial conductor I at the receiving-station and by it communicated through the associated switch J to the coherer. The effect of these waves which pass through the metallic powder of the coherer between the opposing electrodes 5 5 is to render such powder conductive, thereby closing the local circuit through the other opposing electrodes 3 and 4 of the coherer, the battery G, and the magnet O. The magnet being thus energized attracts its armature, moves the valve 30 away from the waste-port of the expansion-chamber 31, and allows the air to escape therefrom faster than it can enter through its restricted supply-passage 33. The expansion-chamber 31 is thus depleted, causing its movable part to open the waste-port 32 of the motor Q, from which the air is thus allowed to escape faster than it can enter through its restricted supply-passage 34. The expansion-chamber of said motor Q being thus depleted promptly in response to the movement of the valve 30 allows spring 40 to move the sounder-lever 37 against its front stop 38. The expansion-chambers of the motors 31 and Q being constantly supplied with compressed air through the passages 33 and 34 will be normally inflated when their waste-ports are closed, which is the normal condition of the apparatus when the magnet O is deënergized, the spring-armature lever 27 being so adjusted by means of the screw 29 as to hold the valve 30 to its seat, thus closing the waste-port of the expansion-chamber 31 when the magnet O is inert. While the apparatus is in service, compressed air is also constantly supplied to the expansion-chambers of the two decohering-motors 19 through the common supply-passage 23 and the restricted supply-ports opening into said chambers. As the valves 14 are caused to open and close alternately by the rocking lever 15 and its actuating connections with said motors, one of said valves being opened when the other is closed, and vice versa, the waste-passages 26 of said motors leading into the coherer-receptacles will be alternately opened and closed. In this way the fluid-supply ports of said motors being restricted and of smaller area than their waste-passages the expansion-chamber of one motor will be inflated while that of the other chamber is being depleted. The frame 20 will thus be caused to swing back and forth by its connections with the movable parts of said motors. This movement of said frame will in turn gradually move the joint connecting the members of the toggle 21 alternately in opposite directions past a straight line intersecting the pivot connections between the members of the toggle and said frame, the link connection between one member of the toggle and the rocking lever 15 operating during this movement as a fixed fulcrum for said toggle. Upon passing such straight line in either direction the springs 22 instantly complete the bending of the toggle in that direction and operate through the rocking lever 15 to instantly shift the valves 14. The motors 19 are thus caused to exhaust alternately at intervals through the coherer-receptacles 1 and to produce intermittent air-blasts upwardly through the metallic powder contained in said receptacles, thereby rendering it non-conductive.

By restricting the common supply-passage 23 more or less by means of the regulating-valve 25 the expansion-chambers of the motors 19 may be inflated and said motors caused to operate more or less rapidly, thereby producing the air-blasts through the coherer-receptacles more or less frequently, as desired. The apparatus is preferably so constructed and adjusted that momentary decohering fluid impulses will be produced through each receptacle of the coherer at regular intervals with periods of rest between such impulses of equal or greater duration. By providing the coherer with a number of variable contacts which are connected in multiple or parallel in the local circuit with the battery and signal-indicating instrument and arranging the decohering mechanism to act alternately or in rotation upon said contacts, so that while one contact is being jarred or agitated another will be at rest, a part of the coherer is in condition at all times to respond to a wave impulse. Uncertainty and confusion in the receipt and indication of signals are thus avoided, and the receiving mechanism is enabled to receive and clearly indicate messages or signals as fast as they can be sent.

The momentary depression of the key of the transmitting mechanism for making dots as well as dashes, according to the Morse code, produces a series of rapid pulsations or undulations; but by reason of the restricted supply-passage of the expansion-chamber 31, which retards the inflation of said chamber, the lever 37 does not respond to such rapid pulsations or undulations which produce a slight but corresponding vibratory movement of the valve 30. The register or sounder is thus made to indicate true Morse characters certainly and positively. By the use of compressed air or other fluid pressure under the control of the magnet O for the operation of the register or sounder the disturbing effects on the coherer of a sufficiently strong auxiliary electric current for that purpose are avoided.

By separating and insulating from each other the electrical connections of the coherer with the wave intercepting or concentrating conductors and with the local circuit for operating or controlling the signal-indicating instrument diversion of the wave impulses through the connections of the local circuit and a consequent diminution of their effect upon the coherer are avoided. Any tendency of the waves to pass from the electrodes 3, connected with the aerial wire, to either of the electrodes 5, connected with the local circuit, in preference to the opposing electrodes 4, which are connected with the metallic base of the coherer or with any suitable capacity, may be obviated by directing the air-blasts by which the metallic powder is agitated through a diaphragm having slits or orifices arranged between adjacent electrodes of the coherer. If necessary to provide for greater capacity, the metal base 12 of the coherer may be electrically connected with any convenient conducting-body $g$, having the requisite area, as shown in Fig. 1. Any tendency of the waves to pass through either side in preference to the other side of the local circuit to the battery, the elements of which might serve to a certain extent as a capacity, is obviated by separating the coils of the magnet O and connecting them with opposite poles of the battery G.

The advantages due to the arrangement hereinbefore described of the electrical connections of the coherer may be obtained with a coherer having but one receptacle for the metallic powder or one variable contact, as shown in Fig. 8, in which the receptacle for holding the metallic powder or other granular conducting substance consists of a tube 41 of any suitable non-conducting material.

The air-blast or fluid impulses for jarring or shaking the powder or other variable contact of the coherer may be produced in various ways. For example, as illustrated in Fig. 12, in place of a fluid-pressure motor for controlling a constant air-supply and admitting it at proper intervals to the coherer fluid impulses may be produced through the coherer by means of a piston 42, actuated by a spring or other motor 43.

The advantages hereinbefore explained of a coherer having a number of variable contacts connected in parallel with the local circuit and a decohering device arranged to jar or shake said variable contacts alternately or in succession may be secured by other means than the intermittent fluid impulses hereinbefore described. For example, as illustrated in Fig. 13, a hammer or tapper 44, operated by any suitable motor, such as a spring-motor 45, is arranged to alternately strike the coherer-receptacles 46, thereby jarring and decohering the powder in one receptacle, while it is at rest in the other receptacle.

Various changes in the details of construction and arrangement of the several parts of the apparatus may be made without departing from the principle and intended scope of our invention.

We claim—

1. In an instrument for recording the passage of electric waves, a wave-intercepting conductor, a suitable variable resistance connected with said conductor, an electric circuit connected with said variable resistance, said circuit and its connections being independent of said conductor connection, a source of current for said circuit and a suitable electromagnetic device in said circuit, whereby electric waves intercepted by said conductor are made to increase the conductivity of said variable resistance and to increase the flow of current in said circuit and through the electromagnetic mechanism to indicate the interception of said waves, substantially as and for the purposes set forth.

2. In a telegraphic receiver, a variable resistance, a suitable connection to said variable resistance whereby electrical impulses from a distance increase the conductivity of said variable resistance, a local electric circuit of which said variable resistance forms a part, a source of electricity for said circuit, an electromagnetic indicating device in said circuit, and suitable mechanism for reducing the conductivity of said variable resistance by means of air disturbance, thus normalizing the medium for the reception and indication of other electric impulses, substantially as and for the purposes set forth.

3. In an electric-wave detector the combination of a coherer electrically connected with a wave-intercepter, and a decoherer adapted to subject the coherer to fluid disturbance whereby its normal condition of non-conductivity is restored, substantially as and for the purposes set forth.

4. In an electric-wave detector the combination of a coherer electrically connected with a wave-intercepting conductor and with a local circuit including a source of current and a wave-indicating instrument, and a decoherer adapted to subject the coherer to fluid disturbance and thereby restore it to its normal condition of non-conductivity, substantially as and for the purposes set forth.

5. In an electric-wave detector the combination of a coherer electrically connected with a wave-intercepting conductor, a decoherer operated independently of the wave impulses and adapted to produce fluid disturbance by which the coherer is restored to its normal condition of non-conductivity, substantially as and for the purposes set forth.

6. In an electric-wave detector the combination of a coherer electrically connected with a wave-intercepting conductor and with a local circuit including a source of current and a wave-indicating instrument, and a decoherer operated independently of the wave impulses and adapted to produce fluid disturbance by which the coherer is restored to its normal condition of non-conductivity, substantially as and for the purposes set forth.

7. In an electric-wave detector the combination of a coherer provided with a number of separate electrodes, a wave-intercepting conductor electrically connected with one of said electrodes and a local circuit electrically connected with two other electrodes of said coherer separate and distinct from the electrode of the wave-intercepting conductor, said circuit including a source of current and a wave-indicating instrument, substantially as and for the purposes set forth.

8. In an electric-wave detector the combination of a coherer consisting of a receptacle containing a powdered or granulated conducting substance and provided with a number of separate electrodes in contact with the powdered or granulated substance, a wave-intercepting conductor connected with one of the electrodes and a local circuit connected with other electrodes of said coherer, said circuit including a source of current and a wave-indicating instrument, substantially as and for the purposes set forth.

9. In an electric-wave indicator the combination of a coherer consisting of a receptacle containing a powdered or granulated conducting substance, and provided with a number of insulated electrodes in contact with said substance, a wave-intercepting conductor connected with one of said electrodes, a local circuit connected with other of said electrodes and including a source of current and a wave-indicating instrument, and a decoherer adapted to subject the said powdered or granulated substance to fluid disturbance whereby the granules are separated and the conductivity of the coherer is destroyed at intervals, substantially as and for the purposes set forth.

10. In an electric-wave detector the combination of a coherer consisting of a receptacle containing a powdered or granulated conducting substance, and provided with insulated electrodes, a wave-intercepting conductor connected with one of the electrodes and a local circuit connected with other of said electrodes and including a source of current and a wave-indicating instrument, and a decoherer operated independently of the wave impulses and adapted to produce intermittent fluid impulses by which the powdered or granulated substance of the coherer is rendered non-conductive at intervals, substantially as and for the purposes set forth.

11. In an electric-wave detector the combination of a coherer provided with insulated electrodes, wave-concentrating conductors connected with a pair of said electrodes and a local circuit connected with another pair of said electrodes and including a source of current and a wave-indicating instrument, substantially as and for the purposes set forth.

12. In an electric-wave detector the combination of a coherer consisting of a receptacle containing a loose powdered or granulated conducting substance, and provided with insulated electrodes, wave-concentrating conductors connected with one pair of said electrodes, and a local circuit connected with another pair of said electrodes and including a source of current and a wave-indicating instrument, substantially as and for the purposes set forth.

13. In an electric-wave detector the combination of a coherer having a number of variable contacts each electrically connected with a wave-intercepting conductor and with a local circuit including a source of current and a wave-indicating instrument, and means for alternately or successively subjecting said variable contacts to fluid disturbance and rendering them non-conductive, substantially as and for the purposes set forth.

14. In an electric-wave detector the combination of a coherer having a number of variable contacts each consisting of a receptacle containing a powdered or granulated conducting substance and each electrically connected with a wave-intercepting conductor and with a local circuit including a source of current and a wave-indicating instrument, and means for alternately or successively subjecting the powdered or granulated substance of the several variable contacts to fluid disturbance whereby said contacts are rendered non-conductive at intervals, substantially as and for the purposes set forth.

15. In an electric-wave detector the combination of a coherer consisting of a receptacle containing a powdered or granulated conducting substance and provided with a screen and means for producing at intervals fluid impulses through said screen, whereby said powdered or granulated substance is agitated and rendered non-conductive at such intervals, substantially as and for the purposes set forth.

16. In an electric-wave detector the combination of a number of variable contacts each provided with fluid connections, valves controlling said connections and a motor adapted to open and close said valves at intervals, substantially as and for the purposes set forth.

17. In an electric-wave detector the combination of a coherer electrically connected with a wave-intercepting conductor and with a local circuit including a source of current, a wave-indicating instrument having a fluid actuating connection, a valve controlling said connection and an electromagnet included in said local circuit for operating said valve, whereby an extra local circuit including a battery and magnet for operating the wave-indicating instrument is dispensed with and consequent disturbing effects on the coherer by self-induction in said circuit are avoided, substantially as and for the purposes set forth.

18. In an electric-wave detector the combination of a coherer electrically connected with a wave-intercepting conductor and with a local circuit including a source of current, a wave-indicating instrument, a fluid-pressure motor for operating said instrument, a valve for controlling said motor, a second fluid-pressure motor for operating said valve, a second valve for controlling the second motor, and a magnet included in said local circuit for operating said second valve, substantially as and for the purposes set forth.

19. In an electric-wave detector the combination of a coherer electrically connected with a wave-intercepting conductor and with a local circuit including a source of current and a wave-indicating instrument, a fluid-pressure motor for operating said instrument having a restricted fluid-supply connection and a waste-passage of larger area, a valve controlling said waste-passage, and a magnet included in said local circuit for operating said valve, substantially as and for the purposes set forth.

20. In an electric-wave detector the combination of a coherer electrically connected with a wave-intercepting conductor and with a local circuit including a source of current and a wave-indicating instrument, a fluid-pressure motor for operating said instrument having a restricted fluid-supply connection and a waste-passage of larger area, a valve controlling said waste-passage, a second fluid-pressure motor also having a restricted fluid-supply connection and a waste-passage of larger area than its supply connection but of smaller area than the waste-passage of the first motor, a second valve controlling the waste-passage of the second motor and a magnet included in said local circuit for operating said second valve, substantially as and for the purposes set forth.

21. In electric-wave-telegraph apparatus the combination of a coherer electrically connected with a wave-intercepting conductor and with a local circuit including a source of current, and a wave-indicating instrument, an associated wave-producing instrument in circuit with an operating-key, a fluid connection with the coherer and a valve controlling said connection and adapted to be actuated so as to subject the coherer to a fluid disturbance whenever the transmitting instrument is in action, substantially as and for the purposes set forth.

22. In electric-wave-telegraph apparatus the combination of a coherer electrically connected with a local circuit including a source of current and a wave-indicating instrument, associated transmitting mechanism comprising a wave-producing instrument, an operating-key and a source of current, a wave intercepting or transmitting conductor and a switch normally connecting said conductor with the coherer and breaking the connection between said conductor and the wave-producing instrument, said switch being adapted to automatically disconnect said conductor from the coherer and connect it with the wave-producing instrument whenever the circuit is closed by said key, substantially as and for the purposes set forth.

23. In electric-wave-telegraph apparatus the combination of a coherer electrically connected with a local circuit including a source of current and a wave-indicating instrument, associated transmitting mechanism comprising an induction-coil, an operating-key and a source of current, a wave intercepting or transmitting conductor, a switch normally connecting said conductor with the coherer and adapted to connect it with the induction-coil, a fluid-pressure motor having a fluid actuating connection, and a valve controlling said connection and operatively connected with said key, substantially as and for the purposes set forth.

24. In electric-wave-telegraph apparatus the combination of wave-transmitting mechanism comprising an operating-key, receiving mechanism comprising a sensitive variable contact having a fluid connection and electrically connected with a local circuit which includes a source of current and a wave recording or indicating device, a wave receiving or transmitting conductor, a switch normally connecting said conductor with said sensitive contact, a fluid-pressure motor for shifting said switch to connect said conductor with the wave-transmitting mechanism, and a valve operatively connected with said key and controlling the fluid connection with said motor and with said sensitive contact, whereby said conductor is disconnected from the receiving mechanism and connected with the transmitting mechanism and the sensitive contact is rendered non-conductive whenever the transmitting mechanism is put in operation, substantially as and for the purposes set forth.

25. In electric-wave-telegraph apparatus the combination of a sensitive variable contact electrically connected with a wave-intercepting conductor and with a local circuit including a source of current and a wave-indicating instrument, and a fluid-pressure motor adapted to intermittently disturb said sensitive contact and thereby reduce its conductivity, substantially as and for the purposes set forth.

26. In electric-wave-telegraph apparatus the combination of a sensitive variable contact electrically connected with a wave intercepting or concentrating conductor and with a local circuit including a source of current and an electromagnetic receiving instrument, a fluid-pressure motor having an exhaust connection with said sensitive contact and a valve operated by said motor and controlling the release of the actuating fluid therefrom and its admission to said contact, substantially as and for the purposes set forth.

27. In electric-wave-telegraph apparatus the combination with a wave intercepting or concentrating conductor and a local circuit including a source of current and an electromagnetic recording or indicating instrument, of a coherer provided with two variable contacts each consisting of a receptacle containing a powdered or granulated conducting substance in electrical connection with said conductor and with the terminals of said local circuit, two expansion-chambers each having a restricted fluid-supply connection and a waste-passage of larger area leading into one of the coherer-receptacles, and valves controlling said waste-passages and operatively connected with movable parts of said expansion-chambers so as to be alternately opened and closed, substantially as and for the purposes set forth.

28. In electric-wave-telegraph apparatus the combination of a coherer provided with two receptacles, each containing a powdered or granulated conducting substance constituting a sensitive variable contact in a local circuit including a battery and an electromagnetic wave-indicating device, two expansion-chambers having fluid-supply connections and waste-passages leading into the coherer-receptacles, valves controlling the passage of the fluid medium through said chambers into the coherer-receptacles and mechanism operatively connected with movable parts of said expansion-chambers and adapted to alternately and suddenly open and close each valve at intervals and to simultaneously close one valve with the opening of the other, substantially as and for the purposes set forth.

29. In electric-wave-telegraph apparatus the combination of a coherer having a number of variable contacts connected in parallel with an electric circuit including a source of current and a wave-indicating device, fluid connections for decohering the variable contacts, valves controlling said fluid connections and mechanism adapted to automatically and alternately open and close each valve at intervals, and to open and close the different valves in rotation, substantially as and for the purposes set forth.

30. In electric-wave-telegraph apparatus the combination with a local electric circuit including a source of current and a sensitive variable contact having separate connections with said local circuit insulated from each other except as to said contact, of a wave-indicating instrument comprising an electromagnet having separated coils included in said circuit, one coil between one terminal of the source of current and the variable contact and the other coil between the other terminal of the source of current and the variable contact, substantially as and for the purposes set forth.

31. In electric-wave-telegraph apparatus the combination of a coherer having separate insulated connections with a wave intercepting or concentrating conductor and with the terminals of a local circuit including a source of current and a wave-indicating instrument comprising an electromagnet having separated coils included in said circuit between said coherer and opposite terminals of said source of current, substantially as and for the purposes set forth.

32. In electric-wave-telegraph apparatus the combination of a coherer consisting of a receptacle containing a powdered or granulated conducting substance and a device adapted to produce fluid impulses through said powdered or granulated substance at intervals with periods of rest between them of equal or greater duration, substantially as and for the purposes set forth.

33. In an electric-wave detector the combination of a coherer electrically connected with a wave intercepting or concentrating conductor and included in a circuit with a source of current and a wave-indicating device, a source of air or other gas pressure connected with said coherer, means controlling the admission of air or other gas to said coherer and means for depriving the air or other gas supplied to the coherer of moisture, substantially as and for the purposes set forth.

In witness whereof we hereto affix our signatures in presence of two witnesses:

WARREN S. JOHNSON.
CHARLES L. FORTIER.

Witnesses:
CHAS. L. GOSS,
M. L. EMERY.